US008243284B2

(12) United States Patent
Studer

(10) Patent No.: US 8,243,284 B2
(45) Date of Patent: Aug. 14, 2012

(54) METHOD FOR MEASURING THE ROUNDNESS OF ROUND PROFILES

(75) Inventor: Urs-Peter Studer, Riehen (CH)

(73) Assignee: Zumbach Electronic AG, Orpund (CH)

( * ) Notice: Subject to any disclaimer, the term of this patent is extended or adjusted under 35 U.S.C. 154(b) by 472 days.

(21) Appl. No.: 12/594,481

(22) PCT Filed: Apr. 1, 2008

(86) PCT No.: PCT/EP2008/002593
§ 371 (c)(1),
(2), (4) Date: Oct. 2, 2009

(87) PCT Pub. No.: WO2008/122385
PCT Pub. Date: Oct. 16, 2008

(65) Prior Publication Data
US 2010/0245843 A1    Sep. 30, 2010

(30) Foreign Application Priority Data
Apr. 4, 2007    (EP) ..................................... 07007089

(51) Int. Cl.
*G01B 11/24* (2006.01)
(52) U.S. Cl. .............. 356/601; 250/559.19; 250/559.31; 356/600; 356/613; 356/2; 382/108
(58) Field of Classification Search .............. 250/559.19–559.31; 356/601, 356/607, 608, 613, 388, 2; 382/108
See application file for complete search history.

(56) References Cited

U.S. PATENT DOCUMENTS
6,549,293 B2 *   4/2003   Hofman .................... 356/608

FOREIGN PATENT DOCUMENTS
| DE | 3916715 | 4/1990 |
| DE | 4037383 | 5/1992 |
| DE | 10023172 A1 | 11/2001 |
| JP | 56117107 | 9/1981 |

OTHER PUBLICATIONS
Wagner M. et al., "Fast Online Laser Measuring Systems for Measuring Diameter and Roundness in a Wire Mill Train," Publishing House, vol. 114, No. 2, pp. 99-101, Dec. 15, 1994.

(Continued)

*Primary Examiner* — Gregory J Toatley
*Assistant Examiner* — Iyabo S Alli
(74) *Attorney, Agent, or Firm* — Venable LLP; Robert Kinberg; Steven J. Schwarz

(57) ABSTRACT

A method for measuring the roundness profiles moved forward in longitudinal direction inside a rolling mill, using two laser scanners, respectively provided with a light-sensitive sensor and a laser. At least three shadow edges that fit against the round profile to be measured and enclose the round profile to form a polygon are generated and measured and the corresponding tangents are computed. The method includes: a) determining a center ($Z_0$) in the measuring field prior to the measuring operation; b) determining perpendicular lines from the center ($Z_0$) to the tangents and measuring the distance from the center ($Z_0$) to the tangents; c) determining a contour by computing the corner points of the polygon enclosing the round profile; d) positioning a reference circle relative to the contour so that: i) the square shape deviation of the contour relative to this reference circle reaches a minimum; ii) the reference circle represents the smallest possible circle that can fit around the contour, iii) the reference circle represents the largest possible circle that can fit inside the contour; or iv) the reference circle together with a different circle, arranged concentric to the reference circle, encloses the contour with a minimum radial difference; e) computing the diameter ($D_{ref}$) of the reference circle and determining from the position in space of the reference center ($Z_p$), which represents the center point of the reference circle, and f) computing at least two vectors extending from the reference center ($Z_p$) to the contour and determining the out-of-roundness from the obtained data.

10 Claims, 7 Drawing Sheets

OTHER PUBLICATIONS

European Search Report of European Application No. 07007089.1 filed Feb. 25, 2008 w/English Translation.

International Search Report of PCT/EP2008/002593 filed Oct. 7, 2008.

* cited by examiner

METHOD FOR MEASURING THE ROUNDNESS OF ROUND PROFILES

The invention relates to a method for measuring the roundness or the shape deviation of round profiles, moved forward in longitudinal direction inside rolling mills, for which at least three shadow edges placed against the round profile to be measured so as to enclose it and form a polygon are generated and measured in a manner known per se with the aid of a measuring instrument provided with at least two laser scanners, each comprising at least one light-sensitive sensor and one laser, and that the respective tangents are computed from this.

In the steel-producing industry, so-called long products are rolled in specialized rolling mills to obtain the desired end products. If these long products are to be rolled into round rods, they are for the most part rolled in a 3-roll finishing stand provided with several roll blocks (in most cases a 3-roll block) to the final dimensions and are then moved to a cooling bed for the cooling down. Normally, four roll blocks with respectively three cylindrical roll discs are used, wherein the center planes of the cylindrical roll discs are rotated by respectively 60° from one roll block to the next roll block. This type of steel rod oftentimes exhibits polygonal shape deviations from the circular shape, most often in the "three-wave" or "six-wave" form.

If the diameter of such a polygonal steel rod is measured across its circumference with a mechanical caliper gauge or optically, all determined diameters can have the same value. In reality, however, the product is not round but is out-of-round/wavy. A product of this type is also referred to as "curve with constant width."

To determine so-called constant width curve errors, caliper gauges with support prisms were used in the past and are still used to date. Depending on the waviness of the circumferential profile, different support angles are recommended for this.

The mechanical measuring and computing operations for determining the roundness have been explained and described for decades with the aid of the relevant DIN standards, for example the German Standard DIN ISO 4291 "Method for Determining the Deviation from the Roundness," DIN ISO 6318 "Roundness Measurement, Terms and Parameters for the Roundness" and DIN ISO 4292, "Method for Measuring Roundness Deviations, Two-Point and Three-Point Measuring Methods."

The mechanical measuring of long products of the type as discussed herein with the aid of mechanical roundness measuring instruments must be realized offline. For this measuring operation, a sample must be clamped into a precision turning mechanism. A tracer then measures the radial deviations of the profile during the rotary movement, resulting in a diagram that shows the circumferential profile with the radii as they relate to the respective angle degree. The evaluation of these circumferential profiles is described in detail in the aforementioned relevant standards.

During the mechanical measuring inside a laboratory, an infinite number of circumferential points can be determined during the rotation of the sample. However, all desired tangents must be measured simultaneously during the measuring operation along the production line where the product is transported in longitudinal direction, so as to be able to determine the profile of a local cross section. A mechanical online measuring is therefore not possible.

One important starting parameter for determining and evaluating the out-of-roundness is the so-called reference circle and its center, which form the reference for all further steps of the measuring operation. Four different methods for determining this are described in the aforementioned standards.

In addition to the mechanical measuring instruments, contactless measuring instruments have also been known for decades (e.g. as disclosed in the documents DE 39 16 715 and the DE 40 37 383 A1). A profile measuring method is furthermore described in the JP 56-117107 A, which uses laser beams to measure and/or scan the long product to be measured. For example, this reference describes that a precise profile measurement can be obtained even with a constant width by placing a first, a second and a third tangent against the outside circumference of an object for which the profile is to be measured and that the profile is measured by determining the difference between a circle determined by these tangents and the profile of the long product to be measured. These tangents are positioned with the aid of laser beams and/or projection beams.

A method for measuring the out-of-roundness of round products and/or round profiles as discussed herein is also known from the document DE 100 23 172 A. This method utilizes a measuring instrument consisting of three or more laser scanners, which are respectively provided with a light-sensitive sensor and a laser. The round product is illuminated by the laser beam of each laser scanner in such a way that the round product projects one or two shadow edges onto the associated sensor. A straight line that extends parallel to the laser beam is computed for each of the shadow edges. A circle against which these straight lines are placed in the form of tangents is furthermore computed from respectively three determined degrees. The computing of the circle is repeated and the out-of-roundness determined as the difference between the largest and the smallest diameter for the circles.

This out-of-roundness determination has the disadvantage that the measuring values are strongly distorted with the smallest of angle errors, in particular if the tangents do not come to rest precisely on the maximum or minimum of the circumferential profile. In addition, the center location in space is not specified. As a result, e.g. with asymmetrical shape deviations, the determined profile can have a symmetry that is periodic to the tangent number and arrangements and does not reflect the true profile character.

It is the object of the present invention to provide a method of the aforementioned type, which uses a contactless measuring instrument for measuring with the highest possible precision the profile and the out-of-roundness along a production line.

This object is solved with the teaching as disclosed in the claims.

For the method according to the invention, at least three shadow edges placed against the round profile to be measured are generated with the aid of a measuring instrument provided with at least two laser scanners. These laser scanners comprise respectively one light-sensitive sensor and one laser.

Figure 1:
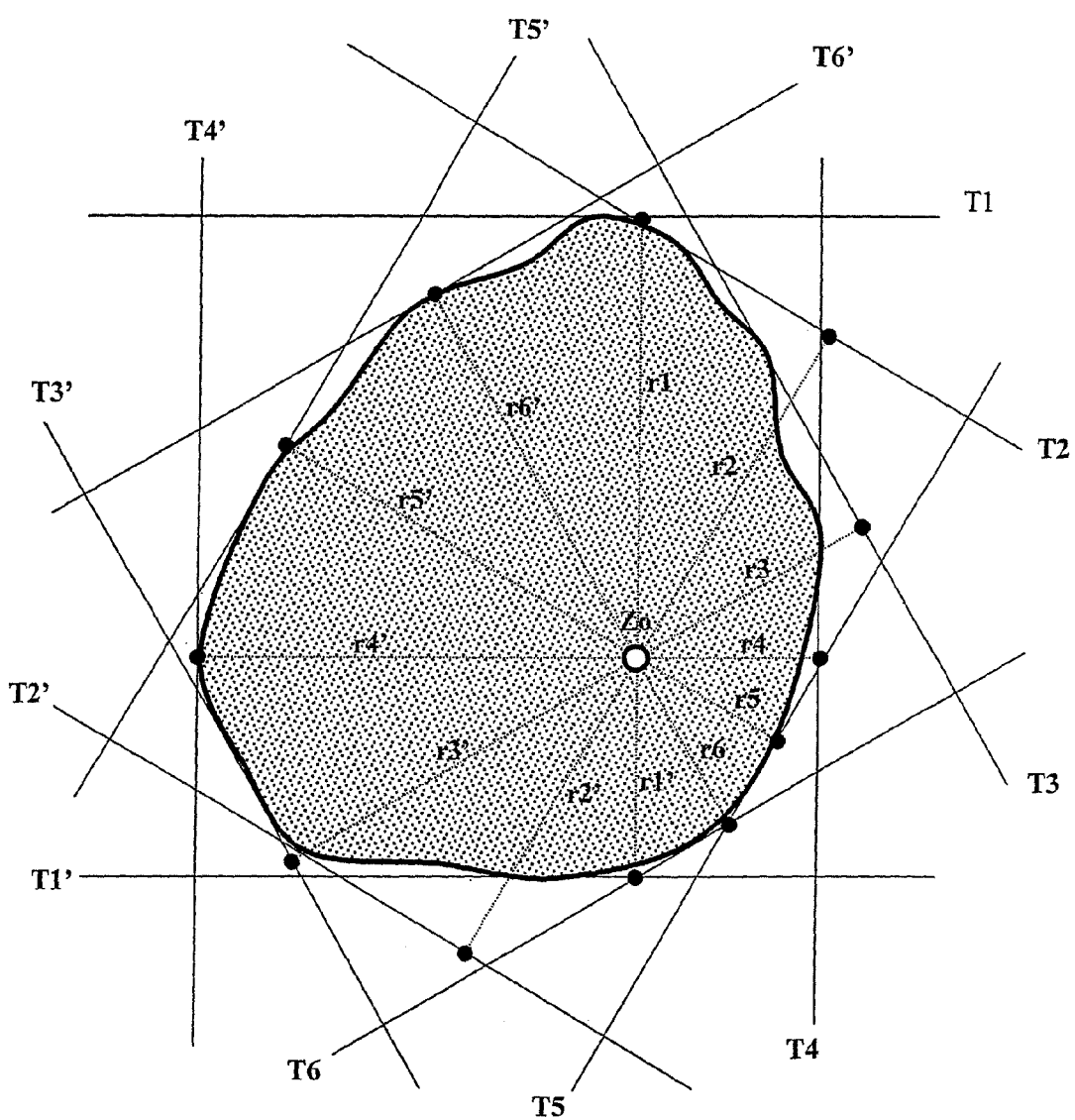
FIG. 1 shows a cross-section through a round profile to be measured.

A measuring instrument of this type is known from the aforementioned references JP 56-117107A and also the DE 100 23 172 A.

If only two laser scanners are used, the round profile to be measured must be positioned completely within the field illuminated by both scanners, so that the required shadow edges (at least three) can be generated and measured with these laser scanners.

In the event that three laser scanners are used, it is sufficient if the round profile is illuminated only in part so that only one shadow edge is generated for each laser scanner.

A straight line, respectively a tangent resting tangentially against the round profile is then computed from these shadow edges. The angles of the straight lines relative to each other are known in this case. The laser scanners are arranged or selected for this in such a way that a polygon is formed with at least three shadow edges. The round profile to be measured in that case falls within the area spanned by this polygon, which is a triangular surface if three shadow edges are used.

Among other things, the method according to the invention is distinguished by the fact that in step a), a center $Z_0$ is calibrated and determined in the measuring field for the measuring instrument, wherein the plane for the measuring field is usefully arranged perpendicular to the forward movement of the round profiles. The calibration of the measuring instrument and thus the determination of the center $Z_0$ in the measuring field must be carried out only once, for example during the assembly of the measuring instrument or following its installation in the rolling mill, that is before realizing the online measurement of the round profiles mentioned herein. However, it is recommended that the calibration be checked and, if necessary, repeated from time to time.

In step b) of the method according to the invention, lines are determined that extend perpendicular from the center $Z_0$ to the tangents measured during the measuring operation, and the distance between the center $Z_0$ and the tangents is thus computed.

From the data computed in step b), the corner points of the polygon enclosing the round profile are computed in step c), which results in the determination of a contour or outline.

In step d) of the method according to the invention a reference circle is then placed inside this contour. This reference circle can be determined in four different ways, namely:

i) The reference circle is positioned such that the square shape deviation of the contour to this reference circle reaches a minimum;

ii) The reference circle is positioned such that it represents the smallest possible circle that fits around the contour;

iii) The reference circle is positioned so as to represent the largest possible circle that fits inside the contour; or iv) The reference circle is positioned relative to the contour in such a way that this reference circle together with another circle, arranged concentric thereto, encloses the contour with a minimum radial difference.

These alternative options for defining the reference circle correspond to the definitions provided in the aforementioned standards. For this, we point in particular to the DIN ISO 6318 "Roundness Measurement" where the definition of the aforementioned reference circle can be found under Item 5. as follows:

5.1 circle for the least square deviation (LSC);
5.2 minimum circumscribed circle (MCC);
5.3 maximum inscribed circle (MIC), and
5.4 circle with minimum ring zone (MZC).

Following the computing and determining of the reference circle, the diameter of the reference circle is computed in step e) of the method according to the invention. From the position in space, the reference center $Z_p$ is computed which represents the center point of the reference circle.

In step f) of the method according to the invention, at least two vectors are computed which extend from this reference center $Z_p$ to the contour. The out-of-roundness is then determined from the resulting data.

Not all generated shadow edges must otherwise be used for computing the corresponding tangents. The selection of the shadow edges to be used for realizing the further computation is made depending on the requirement and the desired parameters, for example the distance or the angle for the tangents. The same is true for the number of perpendicular lines upon which the further computations are based.

However, it is understood that the more tangents are measured simultaneously, the more precise the image of the contour or the profile will be.

The number of laser scanners, however, is usually limited for cost reasons and because of the limited structural size of the measuring instrument. To provide nevertheless the most complete profile image possible, a simulated contour is therefore preferably computed from the available data for the polygon. A simulated contour of this type can be expressed as a numerical approximation with polygons as continuous function (Weierstrass Approximation Theorem), wherein an adapted spline interpolation is preferably used for this contour simulation. Smoothing calculations of this type are quite well known to one skilled in the art.

These steps make it possible to subsequently use all possible analyses and measuring methods and, in the process, be able to take into consideration the total profile character. In particular, there are typical measuring variables that should be determined at a specific angle to the round profile or which must be at a specific angle ratio to the measuring instrument. That is the case, for example, with a 3-roll stand for which the typical GT and DT values are very important when optimizing the adjustment of the individual roll stands, especially for the last and the next to the last stand.

A further advantage of this contour simulation is the fact that it can be used for an optional number of laser scanners. The arrangement of these laser scanners and the angle division need not be regular or uniform, but can be selected based on the requirement. Important factors in this connection are, for example, the spatial conditions and the expected form defects.

In the simplest case, only two vectors are computed with the method according to the invention, thus the distance from $Z_p$ to the contour or to the simulated contour. This already results in a value for the out-of-roundness because the vectors point into different directions and, in most cases, have different dimensions. However, in most cases this is only an approximate value for the out-of-roundness. These vectors are therefore preferably determined and computed such that they represent the minimum distance $R_{min}$ and the maximum distance $R_{max}$ from $Z_p$ to the contour or the simulated contour.

In step f) of the method according to the invention, one set or several sets of 2, 3 or more vectors are preferably determined ($V_{GT1}$, $V_{GT2}$ and $V_{GT3}$, and/or $V_{DT1}$, $V_{DT2}$ and $V_{DT3}$), which extend from $Z_p$ to the contour or the simulated contour. The vectors of a set enclose between them in particular the same angle, for example a 60° or 120° angle. In the case of the 120° angle, a set of this type consists of three vectors.

The vectors of one set preferably point from the reference center $Z_p$ in the direction of the roll gap of the last roll stand while the vectors of another set point from the reference center $Z_p$ in the direction of the roll center for the last roll stand.

If several vector sets exist, the angle enclosed by the vectors is preferably the same for all vector sets. In addition, the vectors of a set are preferably turned relative to the vectors of another set. For example, in particular two sets of respectively three vectors can be computed, wherein the vectors of each set enclose an angle of 120°. If a vector of the first set, for example, points from $Z_p$ in the 0° direction (of course, this reference direction must be specified) of the measuring field (more precisely: the plane for the measuring field) up to the contour or the simulated contour, then the two other vectors point in 120° and/or 240° direction to the contour or the simulated contour. The three vectors of the second set are rotated for this, for example by 60°, so that they point from $Z_p$ in the direction of the 60°, 180° and 300° angle. Typical GT and DT values can be computed from this without difficulty for the 3 roll stands.

According to another preferred embodiment, the measuring instrument is rotated around the round profile, preferably with a rotational movement that oscillates over an angle of 60°. In principle, it is sufficient for the inventive purpose to have three laser scanners which respectively generate one shadow edge/tangent. However, in such a case where only a few shadow edges/tangents are determined and/or generated, the number of generated and/or determined shadow edges/tangents can be increased advantageously as a result of the oscillating rotary movement, which among other things makes it possible to increase the accuracy of the measurements.

The measurements in that case are taken at different points in time, wherein the time interval between the individual measurements is also determined. A movement vector for the round profile can be computed from these data, thus making it possible to detect and compensate for the movement of the round profile. In other words, the measured data are processed mathematically in such a way that the measurements taken at different times relate to the same movement center of the round profile. In detail it means that a first data set is recorded in the first position or the starting position for the rotary and/or oscillating movement, for which the reference center $Z_{p1}$ is determined in the manner as described herein. The corresponding polygon then also follows from the data for the available tangents, wherein this first data set for the tangents etc. is stored.

In a second step, a corresponding second data set is recorded following a specific angle of rotation, for which the data are stored together with the associated reference center $Z_{p2}$. These method steps are repeated until the complete sector is recorded, meaning until n data sets and a corresponding number of reference centers $Z_{pn}$ exist.

For a device having three laser scanners distributed uniformly over an angle of 360°, for example, it means that a sector of 60° is covered by the rotary, respectively the oscillating movement.

Once all data sets have been recorded, all polygons are superimposed in such a way that the reference centers $Z_{p1}$ to $Z_{pn}$, come to rest in the same location, thereby resulting in a polygon which has n times the number of tangents of the individual data sets.

For the above-described example provided with three scanners, for which a data set is determined for each 5°, a polygon of twelve data sets is consequently determined from respectively six tangents. These form jointly a polygon with 72 facets. The end result or the resulting contour is generated—as described herein—by smoothing the polygon obtained in this way, wherein a spline function is preferably used for the smoothing.

Of course, the more data sets are determined over the complete circumference, the more precise the simulated profile. In addition, once a sufficiently high number of tangents have been determined, the contour is imaged with such precision that a smoothing operation or a spline function is no longer even necessary.

It is also possible to select the angle range for the rotary movement to be less than 60°, depending on the number of shadow edges and/or tangents that can be generated.

However, if a sufficient number of laser scanners exist and/or if a sufficiently high number of shadow edges and thus tangents can be generated, the measuring instrument preferably is not rotated.

The data and the measuring values obtained when realizing the method according to the invention are transmitted in the standard way to an evaluation unit and are processed therein. Evaluation units of this type are known and do not require additional explanations.

The invention is explained in further detail in the following with the aid of an exemplary embodiment and with reference to schematic drawings, which diagrammatically show the method steps according to the invention.

FIG. 1 shows a cross section through a round profile to be measured, for which the outside contour is shown with a continuous, bold line. A total of twelve shadow edges are fitted against this round profile with the aid of six laser scanners, wherein these shadow edges lead to the tangents $T_1$, $T_2$, $T_3$, $T_4$, $T_5$ and $T_6$ as well as $T_{1'}$, $T_{2'}$, $T_{3'}$, $T_{4'}$, $T_{5'}$ and $T_{6'}$ and wherein each tangent pair $T_1$, $T_{1'}$; $T_2$, $T_{2'}$; $T_3$, $T_{3'}$; $T_4$, $T_{4'}$; $T_5$, $T_{5'}$ and $T_6$, $T_{6'}$ respectively belongs to one laser scanner. A total of six laser scanners are therefore used, wherein the individual round profile to be measured is always located completely inside the measuring field for these laser scanners.

The center $Z_0$ of the measuring field for the measuring instrument was otherwise determined more precisely and calibrated prior to placing the shadow edges, respectively the tangents.

Even if a total of 12 tangents are placed against the round profile according to the present example, the number of tangents T can be optional. However, a minimum of at least three tangents are required to form a polygon that encloses the round profile, wherein the tangents are positioned at a known angle, relative to each other.

Following the determination of the tangents, the perpendicular lines $r_1$, $r_2$, $r_3$, $r_4$, $r_5$, $r_6$, $r_{1'}$, $r_{2'}$, $r_{3'}$, $r_{4'}$, $r_{5'}$ and $r_{6'}$ are determined and thus the perpendicular distance from $Z_0$ to the respective tangents.

Figure 2:
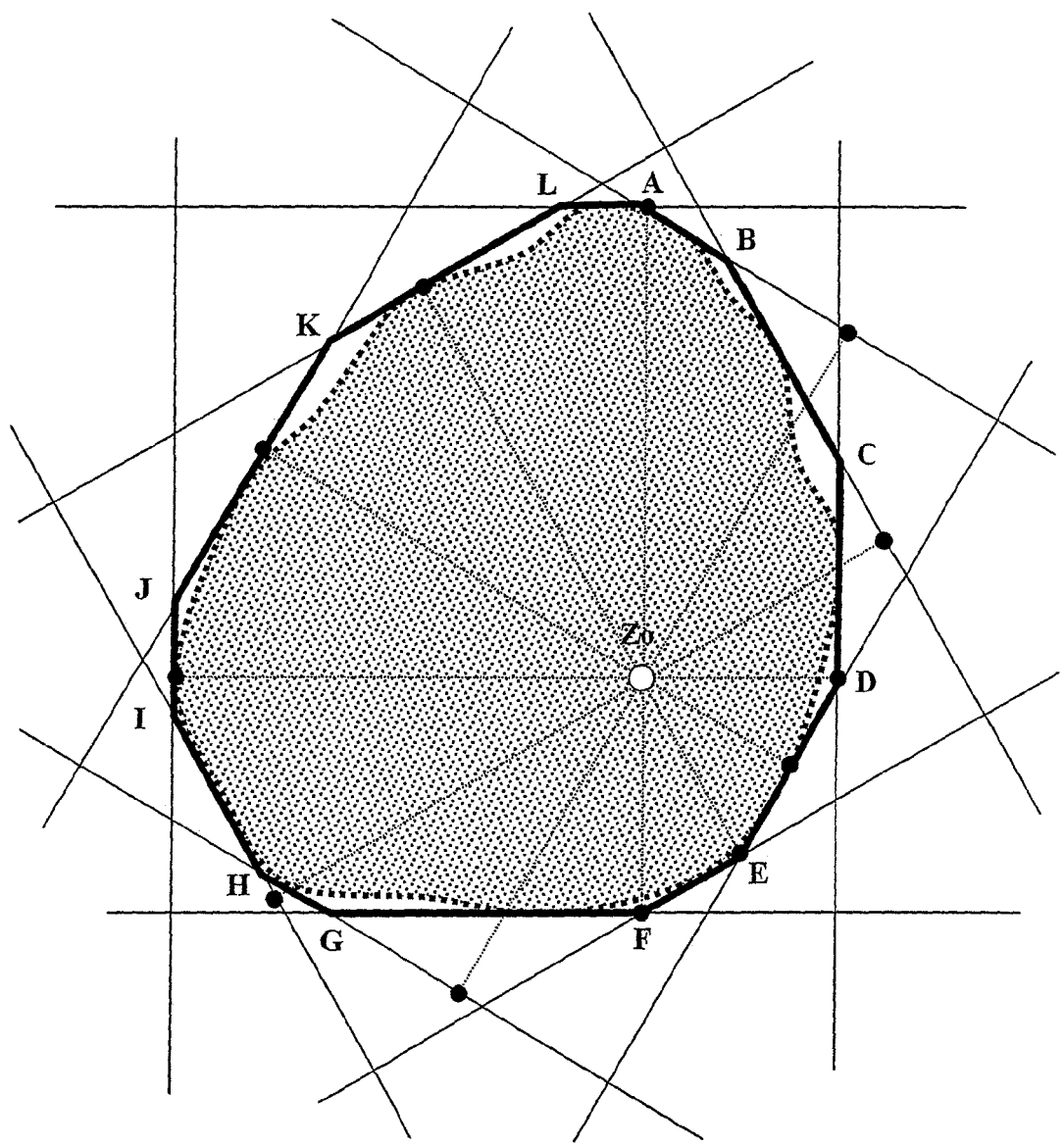
FIG. 2 shows the tangents obtained from a polygon enclosing the round profile.

FIG. 2 shows that the tangents obtained in the manner as described in the above form a polygon with the corners A to L that encloses the round profile. In FIG. 2, the polygon is shown with a continuous, bold line while the round profile is shown with a dotted line.

Figure 3:
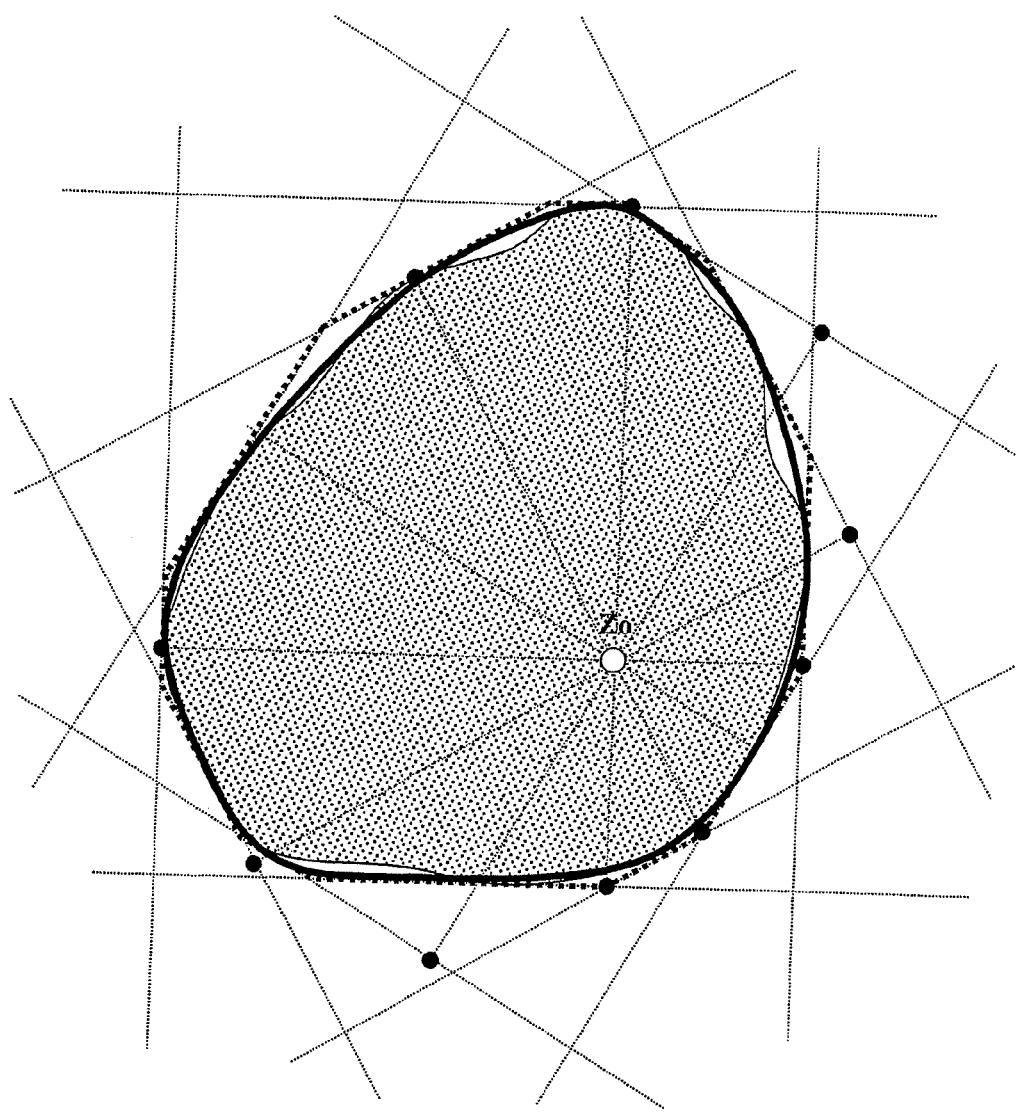
FIG. 3 shows the form of the polygon according to FIG. 2, following a smoothing operation.

FIG. 3 shows the form of the polygon according to FIG. 2 (indicated with a dotted line in FIG. 3) following the smoothing with the aid of an adapted spline interpolation. A simulated contour is generated as a result (continuous, bold line), which for the most part corresponds to the real round profile (continuous thin line). In this way, usable data are obtained along the complete curve. In order words, data can also be determined for locations outside of the real values determined with the aid of the shadow edges or tangents.

Figure 4:
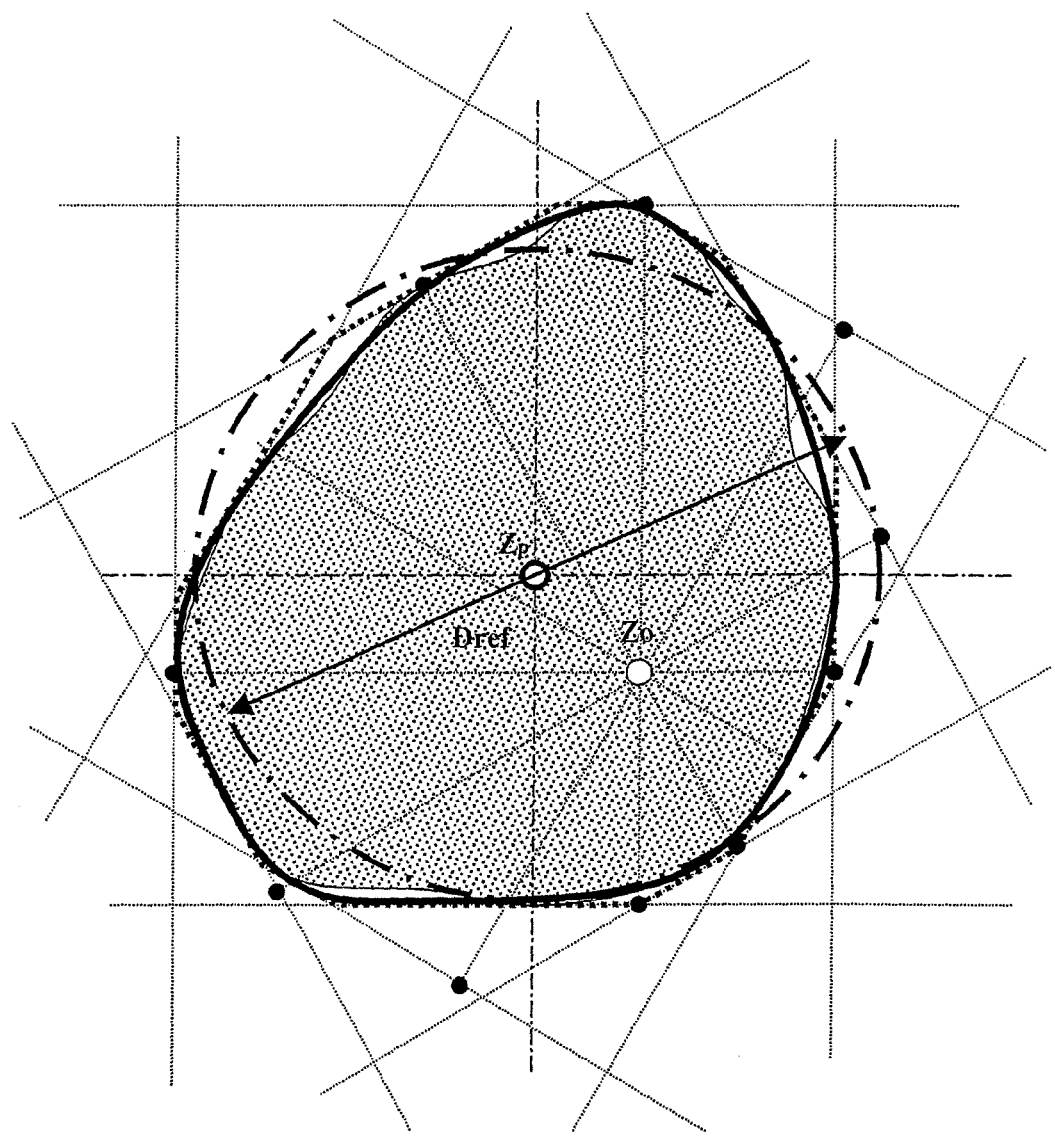
FIG. 4 shows how a reference circle is placed inside a simulated contour.

The diagram in FIG. 4 shows how a reference circle (dash-dot line) is placed inside the simulated contour (continuous, bold line), such that the square shape deviations of the simulated contour to this reference circle (dash-dot line) are at a minimum, wherein the diameter $D_{ref}$ is computed for this reference circle. The reference center $Z_p$ is determined from the position of the reference circle in space.

Figure 5:
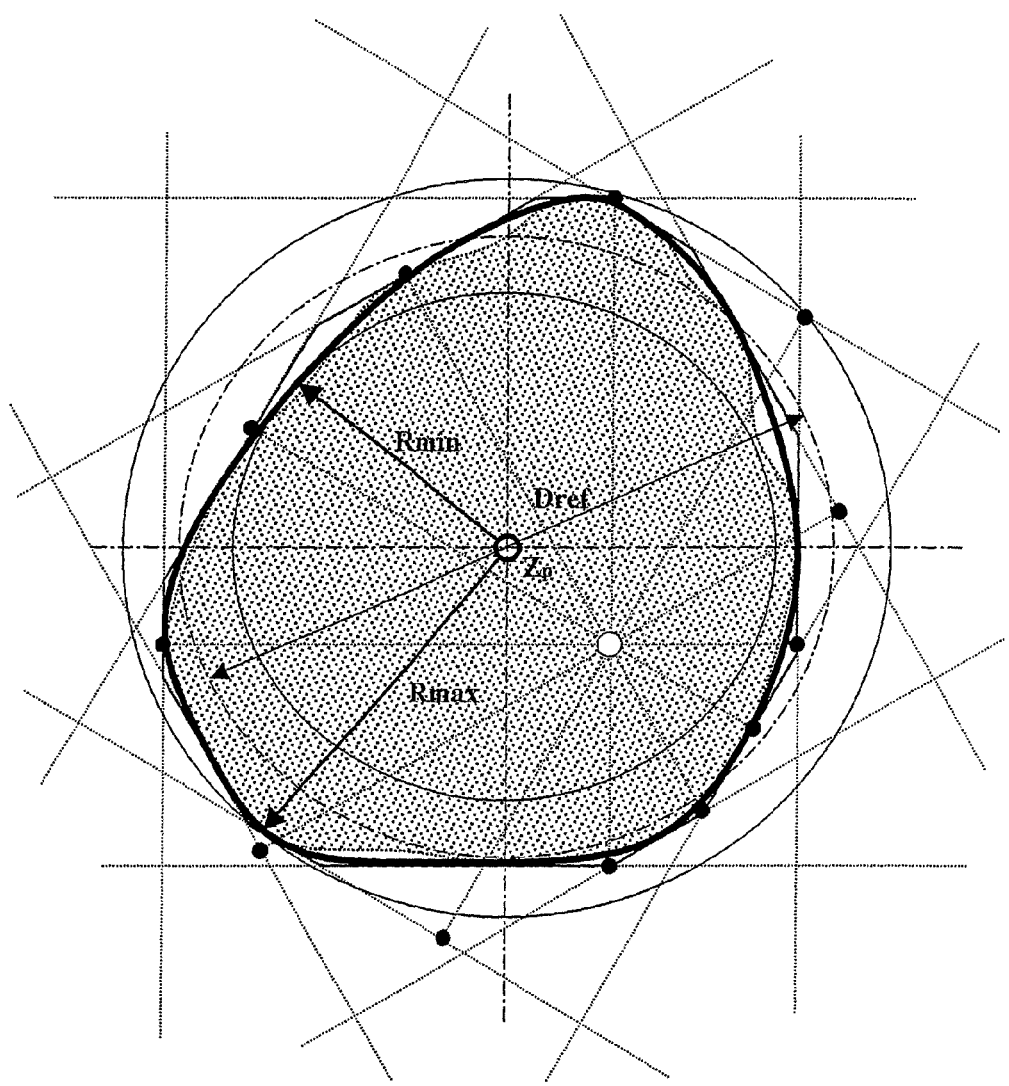
FIG. 5 shows how two vectors are determined, starting from the center $Z_p$.

FIG. 5 shows how two vectors are determined, starting from the thus determined center $Z_p$, namely the minimum distance $R_{min}$ and the maximum distance $R_{max}$ from the reference center $Z_p$ to the simulated contour and how the out-of-roundness is determined from these values. The determined extreme values can be located anywhere along the simulated contour, thus also at angle positions that are located in contour sections between the original measuring points.

Figure 6:
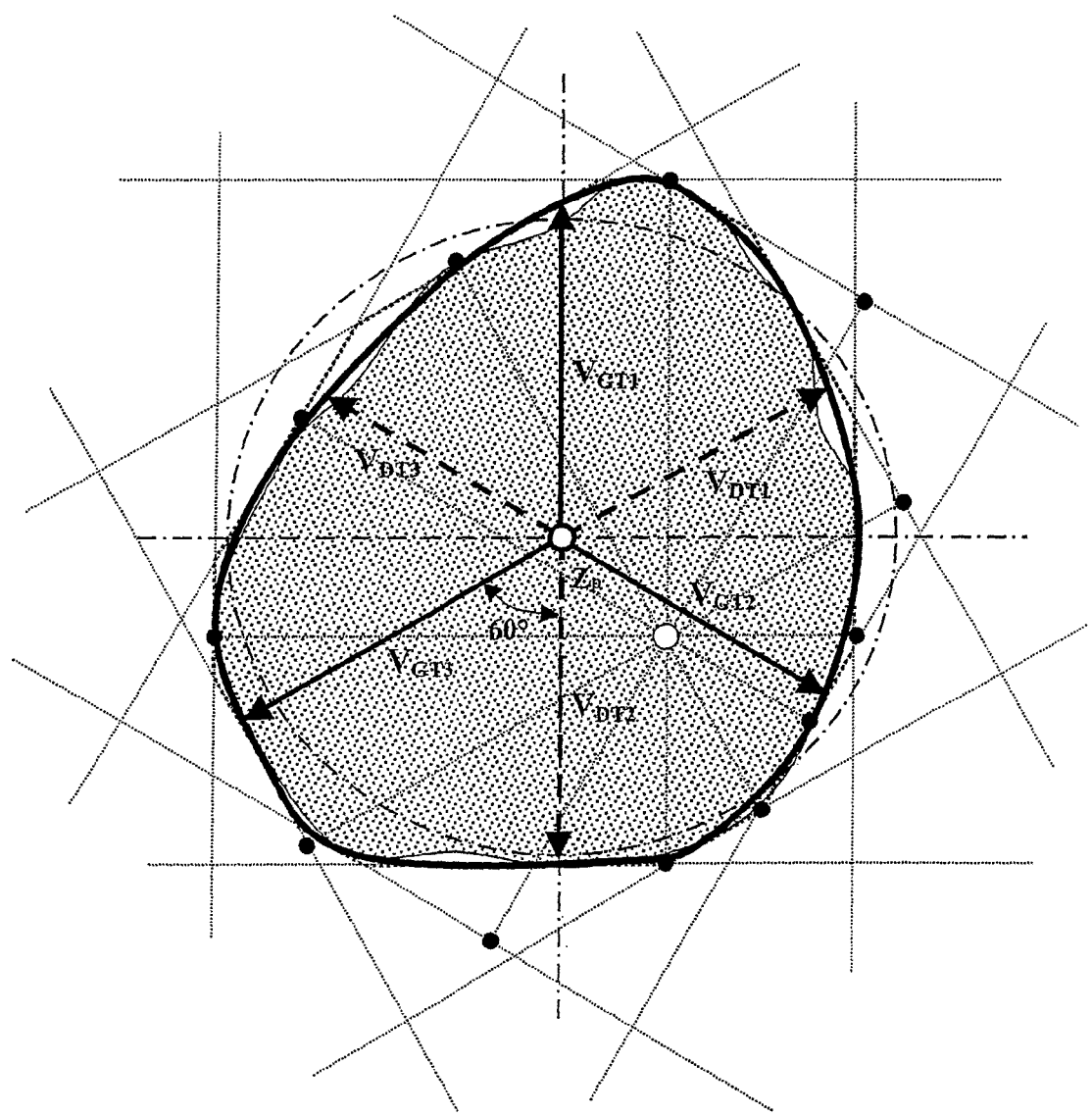
FIG. 6 illustrates an alternative calculation method.

An alternative calculation method is explained with the aid of the diagram shown in FIG. 6. The vectors $V_{GT1}$, $V_{GT2}$ and $V_{GT3}$ on the one hand and $V_{DT1}$, $V_{DT2}$ and $V_{DT3}$ on the other hand are computed for this in step f) of the method according to the invention, wherein these vectors extend from the reference center $Z_p$ in the direction of the cylindrical roll discs of the two last 3-roll stands of a rolling mill. It is assumed that the center plane for the cylindrical roll discs of the next to the last roll stand is at 0°, 120° and 240° and that the plane for the last roll stand is at 60°, 180° and 300°. The 0° and/or 180° plane according to FIG. 6 is that plane, which extends perpendicular to the paper plane and through $V_{GT1}$ and $V_{DT3}$ and is indicated in FIG. 6 with the perpendicular dash-dot line. In other words, the vectors $V_{GT1}$, $V_{GT2}$ and $V_{GT3}$ point toward the gap between the cylindrical roll discs of the last roll stand while the vectors $V_{DT1}$, $V_{DT2}$ and $V_{DT3}$ point toward the center of pressure and/or the center of the rolls for the last roll stand. This center of pressure otherwise is located where the roll gap for the rolls of the next to the last roll stand is normally located.

Using the vectors $V_{GT1}$, $V_{GT2}$ and $V_{GT3}$, it is furthermore possible with the aid of simple mathematical calculations to compute the GT value of interest for the adjustment of roll stands, which is a length measure. The same is true for computing the desired DT value, also a length measure, from the vectors $V_{DT1}$, $V_{DT2}$ and $V_{DT3}$.

These values are critical—as previously explained—for optimizing the adjustment of the individual 3-roll blocks and are turned relative to each other by a fixed angle of 60°.

The measuring instrument required for the method according to the invention frequently cannot be arranged directly behind the last roll stand (for example for space reasons), but only at a distance thereto in downstream direction, resulting in the problem that the completely rolled round profile is rotated during the distance traveled from the last roll stand to the measuring plane for the measuring instrument. The angle at which the round profile is rotated around the longitudinal axis over this distance is generally known for the individual rolling mills.

Figure 7:
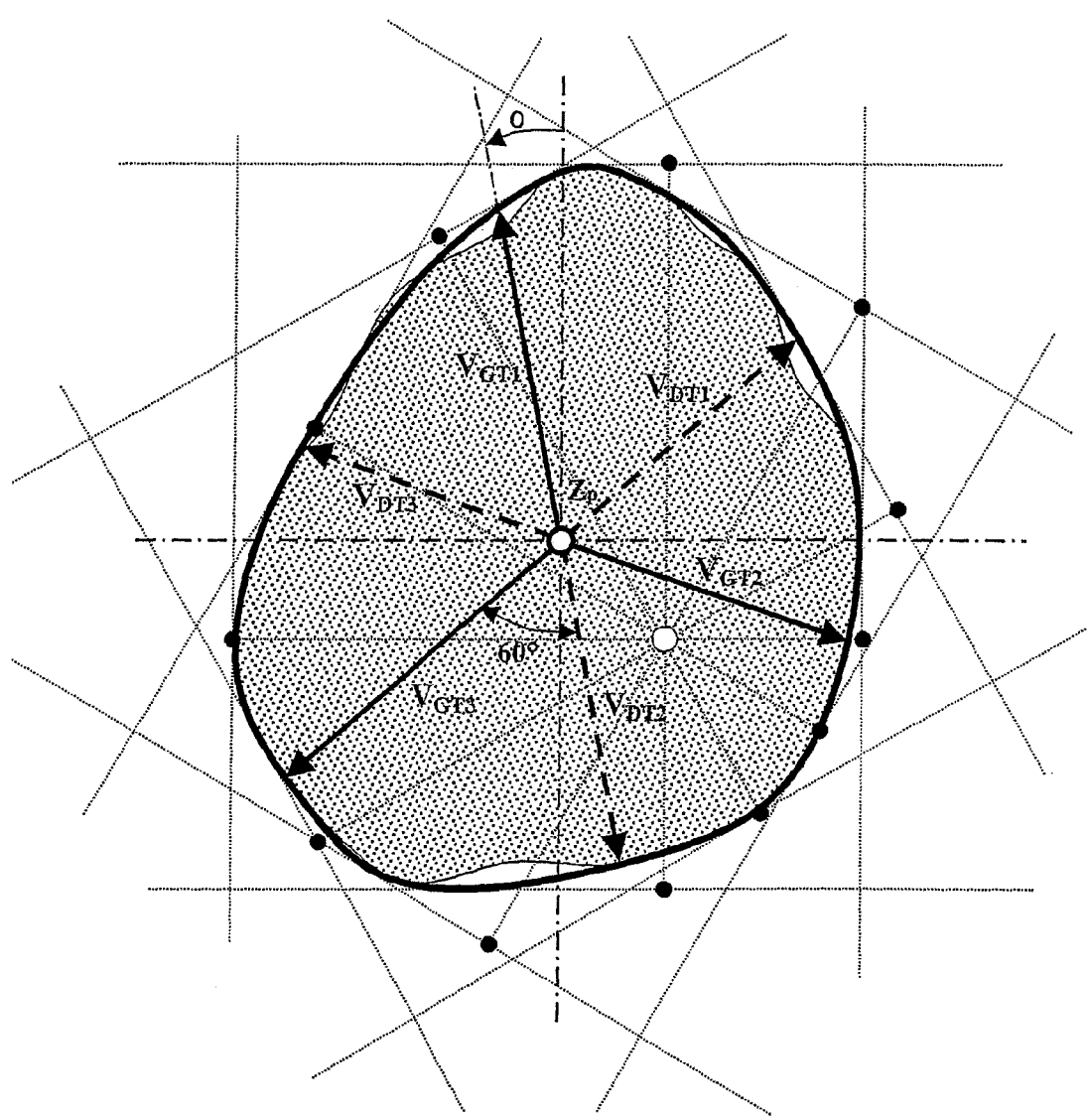
FIG. 7 illustrates how the desired values GT and DT can be computed.

The diagram shown in FIG. 7 illustrates how the desired GT and DT values can be computed despite the rotation of the round profile. Since the angle of rotation with reference a in FIG. 7 is known, the above-described vectors are not determined in angle direction 0°, 120° and 240° (applicable for $V_{GT1}$, $V_{GT2}$ and $V_{GT3}$) and/or 60°, 180° and 300° (applicable for $V_{DT1}$, $V_{DT2}$ and $V_{DT3}$) from $Z_p$ to the simulated contour, as shown in FIG. 6. Rather, these vectors are also rotated by the angle of rotation α. The vectors $V_{GT1}$, $V_{GT2}$ and $V_{GT3}$ and/or $V_{DT1}$, $V_{DT2}$ and $V_{DT3}$ are therefore computed rotated by the angle α from $Z_p$ to the simulated contour (bold, continuous line). The vectors $V_{GT1}$, $V_{GT2}$ and $V_{GT3}$ are shown in FIG. 7 respectively by an arrow with a continuous line while the vectors $V_{DT1}$, $V_{DT2}$ and $V_{DT3}$ are shown by an arrow with a dashed line.

Thus, the typical values for GT and DT can also be determined at the location of the last roll stand, starting with the same reference center $Z_p$ and measured for optional angle positions α, taking into consideration all three vectors $V_{GT1}$, $V_{GT2}$ and $V_{GT3}$ and/or $V_{DT1}$, $V_{DT2}$ and $V_{DT3}$, even if the measurement is realized following a specific distance after leaving the last roll stand.

Since each vector of the vectors $V_{GT1}$, $V_{GT2}$ and $V_{GT3}$ and/or $V_{DT1}$, $V_{DT2}$ and $V_{DT3}$ can be determined individually, the absolute feed distance for the individual rolls on the respective roll stands can be determined with the method according to the invention. For example, if the center of pressure of a roll in a 3-roll block is moved in radial direction further toward the inside than the center of pressure of the other two rolls, this can be determined according to the invention. In that case, the radial position of only one roll must be corrected.

The invention claimed is:

1. A method for measuring the roundness or for measuring the shape deviation of round profiles moved forward in longitudinal direction inside of rolling mills, for which in a manner known per se and with the aid of a measuring instrument using two laser scanners, respectively provided with a light-sensitive sensor and a laser, at least three shadow edges that fit against the round profile to be measured and enclose the round profile so as to form a polygon are generated and measured and the corresponding tangents are computed from this, characterized in that a) prior to the measuring operation a center ($Z_0$) is calibrated and determined in the measuring field, provided such a center ($Z_0$) was not previously determined;

b) perpendiculat lines ($r_1$, $r_2$, $r_3$, $r_4$, $r_5$, $r_6$, $r_{1'}$, $r_{2'}$, $r_{3'}$, $r_{4'}$, $r_{5'}$, $r_{6'}$) are determined from the center ($Z_0$) to the tangents ($T_1$, $T_2$, $T_3$, $T_4$, $T_5$, $T_6$, $T_{1'}$, $T_{2'}$, $T_{3'}$, $T_{4'}$, $T_{5'}$, $T_{6'}$) and the distance from the center ($Z_0$) to the tangents ($T_1$-$T_{6'}$) is computed in this way;

c) the corner points (A to K) of the polygon enclosing the round profile are computed, wherein a contour is determined;

d) that a reference circle is positioned relative to the contour in such a way that i) the square shape deviation of the contour relative to this reference circle reaches a minimum;

ii) the reference circle represents the smallest possible circle that can fit around the contour, iii) the reference circle represents the largest possible circle that can fit inside the contour; or iv) the reference circle together with a different circle, arranged concentric to the reference circle, encloses the contour with a minimum radial difference;

e) the diameter ($D_{ref}$) of the reference circle is computed and determined from the position in space of the reference center ($Z_p$), which represents the center point of the reference circle, and f) at least two vectors extending from this reference center ($Z_p$) to the contour are computed and that the out-of-roundness is determined from the obtained data.

2. The method according to claim 1, characterized in that a step c1) follows the step c) prior to the step d) in which the polygon obtained in step c) is expressed as a numerical approximation with polygons as continuous function in accordance with the Weierstrass Approximation Theorem, wherein a smoothed simulated contour is obtained and the steps d) to f) are realized by using the simulated contour.

3. The method according to claim 2,
characterized in that
the smoothing is carried out with the aid of an adapted spline interpolation.

4. The method according to claim 1,
characterized in that
in step f) the vectors are computed and determined such that they represent the minimum distance ($R_{min}$) as well as the maximum distance ($R_{max}$), extending from the reference center ($Z_p$) to the contour/simulated contour.

5. The method according to claim 1,
characterized in that
one set or several sets of 2, 3 or more vectors ($V_{GT1}$, $V_{GT2}$ and $V_{GT3}$ and/or $V_{DT1}$, $V_{DT2}$ and $V_{DT3}$) are determined, which extend from the reference center ($Z_p$) to the contour and/or the simulated contour and that the vectors of a set in particular enclose the same angle between themselves.

6. The method according to claim 5,
characterized in that
if several sets of vectors exist, the angle enclosed by all vector sets is the same, but that the vectors of one set are rotated relative to the vectors of the other sets.

7. The method according to claim 5,
characterized in that
the vectors of one set point from the reference center ($Z_p$) in the direction of the roll gap of the last roll stand while the vectors of another set point from the reference center ($Z_p$) in the direction of the roll center of the last roll stand.

8. The method according to claim 5,
characterized in that
two sets of respectively three vectors are computed and that the vectors of the first set and the vectors of the second set are rotated relative to each other by a fixed angle of 60° and that typical GT and DT values for the 3-roll stands are determined from this.

9. The method according to claim 1,
characterized in that
the measuring instrument is rotated around the round profile and, in particular, carries out an oscillating rotary movement over an angle of 60°.

10. The method according to claim l,
characterized in that
the measuring instrument is not rotated around the round profile.

* * * * *